United States Patent
Cheng

(10) Patent No.: US 8,731,907 B2
(45) Date of Patent: May 20, 2014

(54) METHOD AND TEST SIGNAL FOR MEASURING SPEECH INTELLIGIBILITY

(75) Inventor: Jun Cheng, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1300 days.

(21) Appl. No.: 12/067,088

(22) PCT Filed: Sep. 20, 2005

(86) PCT No.: PCT/SE2005/001382
§ 371 (c)(1),
(2), (4) Date: Mar. 26, 2008

(87) PCT Pub. No.: WO2007/035140
PCT Pub. Date: Mar. 29, 2007

(65) Prior Publication Data
US 2008/0255829 A1  Oct. 16, 2008

(51) Int. Cl.
*G10L 21/00* (2013.01)
*H04M 9/00* (2006.01)

(52) U.S. Cl.
USPC .............. 704/201; 704/200; 379/406.06

(58) Field of Classification Search
CPC ............ G10L 2021/02082; G10L 21/02; G10L 21/0272; G10L 2021/02165; G10L 25/78; G10L 15/20; G10L 19/00; G10L 2021/02087; G10L 2021/02166; G10L 21/0205; G10L 21/0208; G10L 21/0364; G10L 19/0204; G10L 21/0224; G10L 21/0232; G10L 21/038
USPC .......... 704/200, 200.1, 201, 270; 379/406.02, 379/406.03, 406.06
See application file for complete search history.

(56) References Cited

U.S. PATENT DOCUMENTS 5,602,913 A * 2/1997 Lee et al. ................. 379/406.06

FOREIGN PATENT DOCUMENTS

JP     2005-176071 A     6/2005

OTHER PUBLICATIONS

"ETSI Speech Quality Test Event Calling Testing Speech Quality of a VoIP Gateway", A white paper from the ETSI 3rd SQTE (Speech Quality Test Event) version I, AudioCodes Ltd. 2005.*
ITU-T Recommendation P.501 (Aug. 1996), "Test Signals for use in Telephonometry."*
"ETSI Speech Quality Test Event Calling Testing Speech Quality of a VoIP Gateway", A white paper from the ETSI $3^{rd}$ SQTE (Speech Quality Test Event) version 1, AudioCodes Ltd. 2005. See p. 4, line 1-p. 5, line 3; p. 9, line 3-p. 10, line9, figures 5.145-5.149.
ITU-T Recommendation G.168 (Aug. 2004) "Digital network echo cancellers". See p. 9, line 33-p. 10, line 66 p. 25, line 1-p. 28, line 9 and summary.

* cited by examiner

*Primary Examiner* — Angela A Armstrong

(57) ABSTRACT

A method and apparatus for estimating speech intelligibility in a mobile communications network component handling two-way communication between two ends of a signal path. Test signals adapted for speech intelligibility measurements are inserted into the signal path to simulate two-way communication. Double-talk is detected during the communication, and speech intelligibility measurements are performed only during periods of double-talk. This enables the effect of echo to be taken into account while avoiding undesirable effects from non-linear processing, and comfort noise if present, in the signal path. Voice enhancement devices may then be adjusted in response to the estimated speech intelligibility.

17 Claims, 7 Drawing Sheets

METHOD AND TEST SIGNAL FOR MEASURING SPEECH INTELLIGIBILITY

TECHNICAL FIELD OF THE INVENTION

The present invention generally relates to objective measurements of speech intelligibility in mobile communication networks, and more particularly to a novel approach for measuring and/or improving speech intelligibility in such networks.

BACKGROUND OF THE INVENTION

The intelligibility of speech, simply referred to as speech intelligibility, generally relates to how well speech is understood, and is a measure of the effectiveness of speech communication. A person that talks rapidly or in a slurred manner may be very difficult to understand. However, even a well-spoken message in the native language of the listener can be misunderstood by the listener if the message is not fully audible and/or if it has been distorted on the way to the listener. On the other hand, a synthesized voice for example may be well understood by a listener, but considered harsh, unnatural and of generally low quality, implying that a message lacking quality may still be intelligible. Speech intelligibility is therefore generally not limited to speech quality, but often regarded as a more general measure of the effectiveness with respect to the understanding of the speech.

There exist standardized methods for subjectively measuring speech intelligibility based on listening tests performed by a large number of human talkers and listeners. In ITU-T standard P.800 named "*Methods for subjective determination of transmission quality*", a so-called Mean Opinion Score (MOS) method ranged from 0-5 is proposed to evaluate the speech quality of a telecommunication system by listening tests. However, the requirements on this type of tests with a large and carefully selected group of talkers and listeners make the measurements very costly and time-consuming. Besides, it is obviously not possible to real-time feed the speech quality results back into the considered system.

There is therefore a general interest in defining methods for objectively measuring speech intelligibility, thereby eliminating time-consuming and subjective evaluation.

In ITU-T G.168 "*Digital network echo canceller*", figures I.6-15/G.168 demonstrated some relations between subjective speech quality and objective measurements, which throw light on the possibility to measure speech quality/speech intelligibility by an objective method.

IEC 60268-16 "*Objective rating of speech intelligibility by speech transmission index*" in Sound System Equipment is a standardization work that relates to objective methods for determining transmission quality of speech with respect to intelligibility. The methods can be used to compare speech transmission quality at various positions and for various conditions in the same listening space or for assessing a speech communication channel, and in particular for assessing the effect of changes in the acoustic properties, e.g. the effects from echo, reverberation and noise.

A practical configuration of a measuring system for speech intelligibility proposed in IEC 60268-16 typically involves a sound source/loudspeaker and a microphone. A so-called speech transmission index (STI) is measured based on the reduction of modulation of a set of test signals when sounded in a room such as a theater or a concert hall or through a communication channel. For measurements in a room such as a theater, each test signal will typically be transmitted by a sound source towards a microphone system that receives the transmitted sound. More precisely, the speech transmission index (STI) is an objective measure based on the weighted contribution of a number of frequency octave bands within the frequency range of speech. Each frequency octave band signal is modulated by a set of different modulation frequencies to define a complete matrix of differently modulated test signals in different frequency octave bands. A so-called modulation transfer function, which defines the reduction in modulation, is determined separately for each modulation frequency in each octave band, and finally the modulation transfer function values for all modulation frequencies and all octave bands are combined to form an overall measure of speech intelligibility.

The speech transmission index for telecommunication systems STITEL is a simplified version of STI, and may be used instead of STI under typical conditions of a single telecommunication channel.

Although the introduction of the STI methods represents a significant progress with regard to objective measurement of speech intelligibility, these methods are still quite time-consuming because of the relatively large set of test signals required, and they are also customized for measurements in relatively simple settings such as constrained listening spaces or isolated communication channels.

In modern mobile communication networks, there are often more complex technical settings including interrelated signal paths with effects of echo, reverberation and noise. In the digital core network of a public land mobile network (PLMN), for example, there are generally so-called voice enhancement devices such as echo cancellers (EC), noise reduction (NR), mobile cross-talk control (MCC) and level control (LC) devices for improving speech quality and speech intelligibility. On the network side, the echo canceller (EC) is a particularly important voice enhancement device responsible for handling the part of the far-end signal that is reflected into the near-end signal path as a disturbing echo. In such more complex technical settings, there is a demand for effective methods for objectively measuring speech intelligibility. The measurement results could then serve as a basis for optimizing and coordinating the operation of voice enhancement devices in networks such as the digital mobile core network.

RELATED ART

The international patent publication WO 2004/002127 A1 relates to an echo canceller with dedicated non-stationary echo canceling properties. The non-stationary echo canceller is proposed in order to prevent the stationary component in the echo estimate, especially in the residual echo, from continuously distorting near end speech. This improves the echo canceller performance in terms of speech quality and speech intelligibility, which is particularly important in cases of single talk near end speech, as opposed to double talk.

U.S. Pat. No. 5,636,272 relates to a method and apparatus for increasing the intelligibility of the loudspeaker output and for echo cancellation in a telephone. The telephone includes an intelligibility booster for processing a speech input signal to generate an intelligibility-enhanced signal.

SUMMARY OF THE INVENTION

It is a general object of the present invention to provide effective ways of measuring speech intelligibility in mobile communication networks.

It is a specific object to provide a method and arrangement for measuring speech intelligibility in a network component handling two-way communication between two ends such as a near-end and a far-end.

In particular, it is desirable to provide an effective way to objectively measure speech intelligibility in a network component with at least one non-linear voice-enhancement device such as an echo canceller in the near-end signal path.

It is another specific object of the invention to reduce the time required for objective measurement of speech intelligibility.

It is also a general object of the invention to optimize the operation of voice enhancement devices in the mobile communication network in response to objective measurements of speech intelligibility, thereby improving the speech intelligibility.

It is an object of the invention to provide a method and system for improving speech intelligibility in a mobile communication network.

These and other objects are met by the invention as defined by the accompanying patent claims.

The invention generally relates to measurement of speech intelligibility in a mobile communication network component handling two-way communication between two ends, typically a near-end and a far-end. A basic idea is to simulate two-way speech communication based on test signals adapted for speech intelligibility measurements, detect double-talk during the simulated speech communication, and perform the speech intelligibility measurements only at periods of double-talk. In this way, it is for example possible to take the effects of echo into account in the speech intelligibility measurements, while avoiding undesirable effects from possible non-linear processing in the signal path for which speech intelligibility is measured.

In many applications, the near-end signal path normally comprises one or more voice enhancement devices with speech-activity controlled non-linear signal processing such as an echo canceller with a selectively active non-linear processor and an associated comfort noise generator. The non-linear processing generally changes the input-output relation of the near-end signal path and (together with possible comfort noise) makes an objective measurement of speech intelligibility very difficult, not to say virtually impossible. By employing double-talk detection and only measuring intelligibility at periods of double-talk, the undesirable effects from non-linear processing in the near-end signal path will generally be avoided in the speech intelligibility measurements.

The inventor has recognized that the non-linear signal processing (NLP) is typically off when the near-end signal is above a given threshold. At the same time, it is usually important to also consider the far-end signal, which is the source of for example hybrid echo, in order to obtain measurement results that are representative of real conditions in network communication. Double-talk detection makes it possible to ensure that the measurements are made when NLP is off (so that the NLP do not alter the input-output relation) and no comfort noise is added, and that echo from the far-end signal path is considered in the measurements as desired.

Preferably, the measurement results are then used as feedback to analyze and/or control the operation and coordination of relevant voice enhancement devices such as echo cancellers, noise reduction, mobile cross-talk control and level control devices. For example, voice enhancement devices in the mobile network may have to be updated or replaced by new devices from time to time to meet new requirements and/or standards. In this process, it may be useful to test the effects of new or updated voice enhancement devices with respect to speech intelligibility and possibly adjust the configuration of the devices before implementing them in the network.

The measure of speech intelligibility is preferably estimated based on measurements of changes in signal characteristics over at least part of the near-end signal path, generally including any non-linearly operating voice enhancement devices.

The measure of speech intelligibility is preferably representative of transmission quality of speech with respect to intelligibility (also referred to as speech transmission index) and estimated based on measurements of the reduction of modulation, in similarity to standardized methods used for concert halls and theaters.

Another aspect of the invention concerns the use of a new and highly effective test signal. The new test signal preferably comprises a noise carrier, which has a speech-shaped spectrum and which is modulated by a frequency-sweep signal. This is much more effective compared to the use of a complete matrix of differently modulated test signals in different frequency octave bands and determining the modulation transfer function separately for each modulation frequency in each octave band as proposed in the IEC 60268-16 standard. By emulating normal speech over the entire relevant frequency range in a test signal and modulating the speech-shaped test signal by a frequency sweep, the measurement procedure is made much more effective. It is basically sufficient to use a single test signal, which makes the measurement procedure both time-effective and manageable. This aspect of the invention is generally applicable to any measurements of speech intelligibility in mobile network components handling two-way communication.

The invention offers the following advantages:

Objective measurement of speech intelligibility in mobile communication networks;

Optimized operation and coordination of voice enhancement devices in the mobile network;

Improved speech intelligibility;

Time-effective and manageable measurement of speech intelligibility;

The effects of echo of the far-end signal path is taken into account in the speech intelligibility measurements, while avoiding undesirable effects from possible non-linear processing in the near-end signal path.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
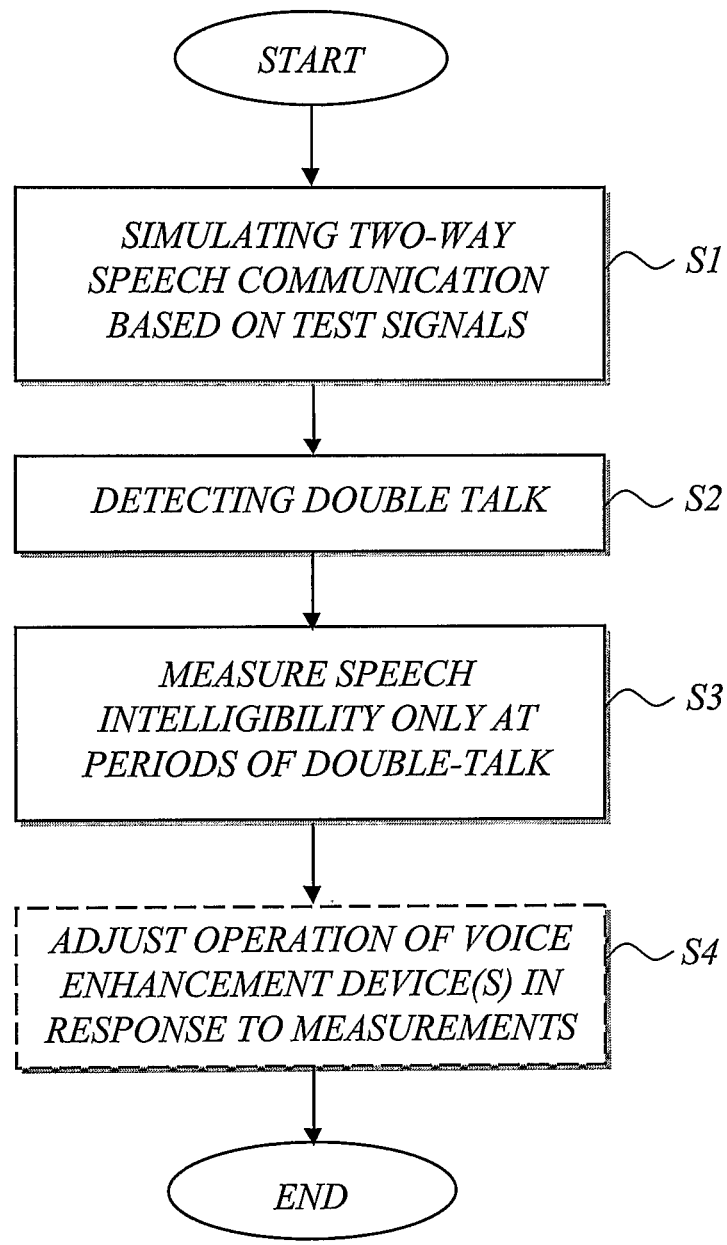
FIG. 1 is a schematic flow diagram of a method for measuring/improving speech intelligibility according to a preferred exemplary embodiment of the invention.

Throughout the drawings, the same reference characters will be used for corresponding or similar elements.

The invention will now be described with reference to exemplary embodiments in exemplary mobile network applications, and it should be understood that the invention is not limited to these examples.

As previously mentioned, the invention generally relates to measurement of speech intelligibility in a mobile communication network component handling two-way communication between two ends, typically a near-end and a far-end.

With reference to the flow diagram of FIG. 1, the basis for the speech intelligibility measurements is to simulate (S1) two-way speech communication through the considered network component by using suitable test signals adapted for speech intelligibility measurements. It is then suggested to detect (S2) double-talk during the simulated speech communication by using a double-talk detector, and perform (S3) speech intelligibility measurements only at periods of double-talk. This way of measuring speech intelligibility generally means that the effects of echo can be taken into account in the speech intelligibility measurements, while avoiding undesirable effects from possible non-linear processing in the signal path for which speech intelligibility is measured. Optionally, the measurement results are then used as feedback to analyze and/or control (S4) the operation and coordination of voice enhancement devices in the considered mobile communication network.

Figure 2:
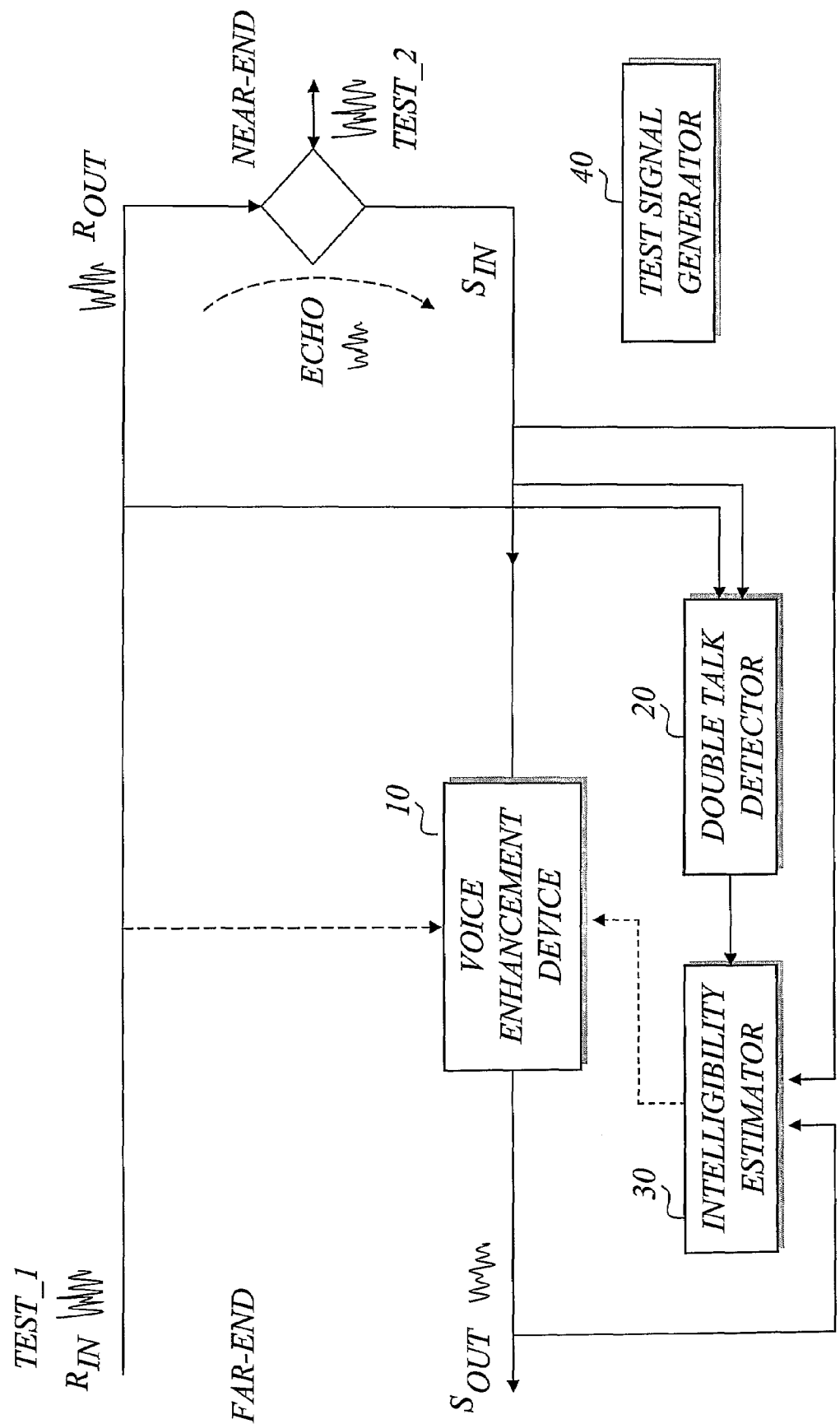
FIG. 2 is a schematic diagram of relevant parts of a network component handling communication between a far-end and a near-end, including an (internal/external) arrangement for effectively measuring speech intelligibility according to a preferred exemplary embodiment of the invention.

In many applications, as illustrated in the exemplary diagram of FIG. 2, the near-end signal path on the network side normally comprises one or more voice enhancement devices 10 with speech-activity controlled non-linear signal processing, such as an echo canceller with a selectively active non-linear processor and an associated comfort noise generator. The non-linear processing generally changes the input-output relation of the near-end signal path and (together with possible comfort noise) makes an objective measurement of speech intelligibility very difficult, not to say virtually impossible.

A careful analysis by the inventor reveals that the non-linear signal processing is typically off when the near-end signal is above a given threshold. At the same time, it is recognized that it is important to also consider the far-end signal, which is the source of hybrid echo. In all, the speech intelligibility measurements should therefore be executed only when there are near-end signal energies and far-end signal energies at the same time, i.e. at double-talk conditions, to account for possible hybrid echo and to avoid the adverse effects of the non-linear processing.

The idea according to the invention is therefore to employ a double-talk detector 20, which detects double-talk in the simulated speech communication, i.e. detects higher signal energies from both the near-end and the far-end. The output of the double-talk detector is forwarded to a speech intelligibility estimator 30, which then performs speech intelligibility measurements only at periods of double-talk.

In order to simulate two-way speech communication, the arrangement preferably comprises a test signal generator 40 for generating suitable test signals TEST_1, TEST_2. These test signals are inserted into the network component, preferably into the far-end signal path and the near-end signal path, respectively.

Preferably, the measurement results are then used as feedback (as indicated by the dashed line from the intelligibility estimator to the voice enhancement device) to analyze and/or optimize the operation of the voice enhancement device(s). For example, voice enhancement devices in the network may have to be updated or replaced by new devices from time to time to meet new requirements and/or standards. In this process, it may be useful to test the effects of new or updated voice enhancement devices with respect to speech intelligibility and possibly adjust the configuration of the devices before implementing them in the network. This may for example be performed as part of the normal maintenance/testing/update of the network.

The measure of speech intelligibility is preferably estimated based on measurements of changes in signal characteristics over at least part of the near-end signal path, generally including any non-linearly operating voice enhancement devices.

In a mobile network component handling two-way communication between two ends, such as a near-end and a far-end, there are generally two inputs and two outputs. With reference to the exemplary diagram of FIG. 2, $R_{IN}$ denotes the input signal from the far-end, and $R_{OUT}$ denotes the output signal to the near-end. $S_{IN}$ denotes the total input signal from the near-end (including possible echo from the far-end signal), and $S_{OUT}$ denotes the output signal to the far-end. Preferably, the test signal TEST_1 is inserted at the far-end input, and the test signal TEST_2 is inserted at the near-end input. As mentioned, with hybrid echo, the SIN signal will be representative of both the inserted test signal TEST_2 and the echo contribution ECHO from the far-end signal path.

The measure of speech intelligibility is preferably representative of transmission quality of speech with respect to intelligibility (also referred to as speech transmission index) and estimated based on measurements of the reduction of modulation. For example, let's assume that the test signal TEST_2 at the near-end has a nominal 100% modulation, and the $S_{IN}$ signal including hybrid echo has a modulation of say 40%, and the $S_{OUT}$ signal has a modulation of say 15%. The speech transmission index STI can then be calculated based on the reduction in modulation rate, which in the above example is 40%−15%=25%. If the STI index is directly proportional to the reduction in modulation rate, the STI improvement will be 0.25. In practice, an estimate of speech transmission index STI can then simply be estimated as the difference in power (dB) between $S_{IN}$ and $S_{OUT}$, measured at double-talk time and at signal valley time.

Figure 3:
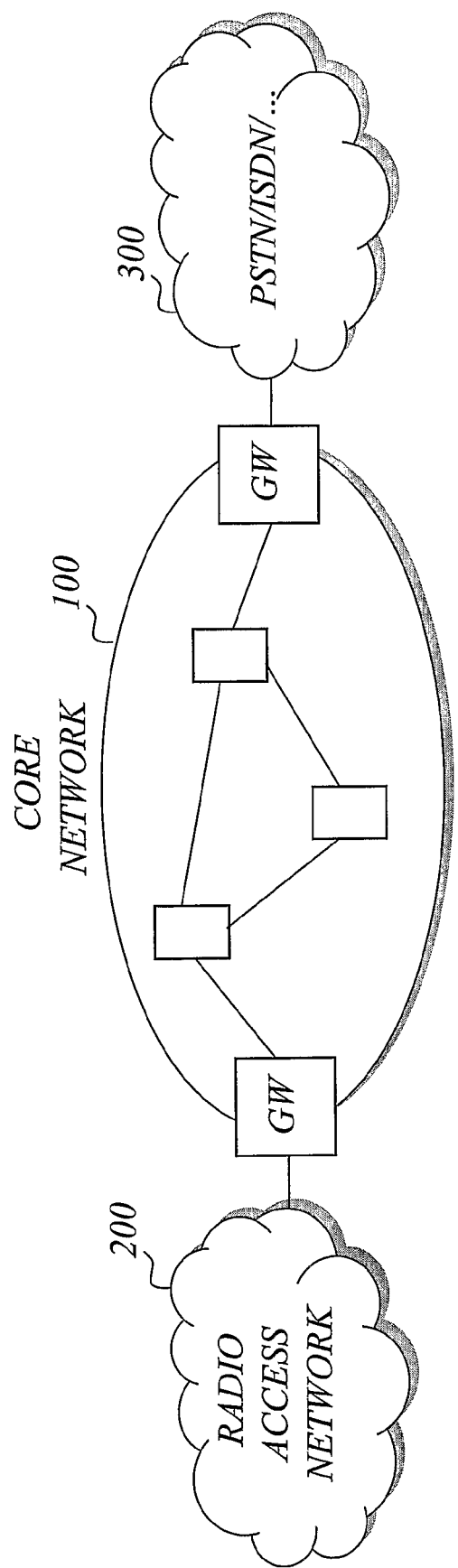
FIG. 3 is a schematic diagram illustrating a conventional mobile network overview with a core network connecting different networks such as a radio access network and a public switched telephone network.

For a better understanding of the invention, it may be useful to describe the invention with respect to a particular application in a communication gateway in a mobile core network. With reference to FIG. 3, which illustrates an overall public land mobile network (PLMN), a digital core network 100 interconnects different networks such as a radio access network 200 and a public switched telephone network (PSTN), Integrated Services Digital Network (ISDN) or equivalent network. The mobile core network typically has nodes for control and management, as well as nodes for voice and data switching and routing, including so-called gateways (GW) for bridging between different transmission technologies and to add services to end-user connections.

Figure 4:
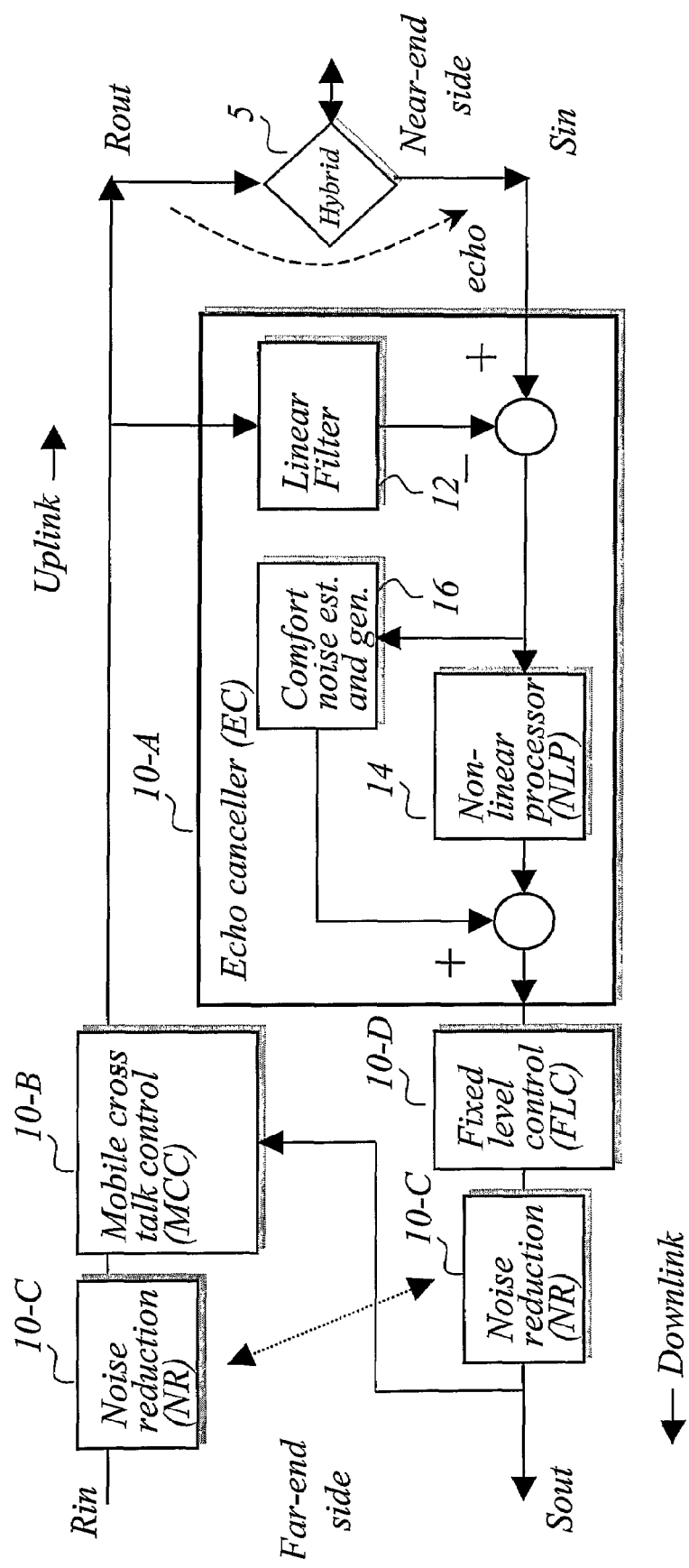
FIG. 4 is a schematic diagram illustrating an exemplary arrangement of voice enhancement devices on the network side of a conventional digital mobile network.

FIG. 4 is a schematic diagram illustrating an exemplary arrangement of voice enhancement devices on the network side of a conventional digital mobile network. A gateway bridging to/from a PSTN network generally includes a hybrid 5, which is a device that converts a 4-wire circuit with separate transmission paths into a 2-wire subscriber line. The cost for cabling rules out the idea of running a 4-wire circuit out to the subscriber's premises from the local exchange. For this reason an alternative solution had to be found. Hence, the 4-wire to 2-wire hybrid was introduced many years ago. Unfortunately, the hybrid is a leaky device by nature. Depending on the subscriber line impedance, a part of the signal going towards the near-end (PSTN) side will be reflected back towards the far-end side, causing a disturbing echo, so-called hybrid echo. Due to the transmission delay introduced by radio transmission of the speech signal in the radio network, this echo needs to be controlled to avoid being disturbing to the far-end talker. An echo canceller (EC) 10-A is therefore used on the network side to control the echo.

In a normal echo canceller, a linear filter 12 is applied to cancel the linear part of the echo, and a non-linear processor (NLP) 14 is used to remove the residual echo and a comfort noise estimator and generator 16 injects comfort noise. The linear filter 12 is normally an adaptive filter that adaptively tries to estimate the echo signal that goes through the hybrid. The filter will typically converge to a good estimate within a second. If the estimate is good the linear echo will be cancelled. However, when both persons talk at the same time, the adaptive filter often diverges and the estimate will not be representative of the echo. For this reason, there may be an internal double-talk detector in the echo canceller for stopping the filter adaptation during double-talk to avoid filter divergence. The linear adaptive filter alone will not remove the entire echo, and a remaining so-called residual echo can still be present. In order to remove the residual echo, a non-linear processor 14 is typically arranged in the echo canceller. The non-linear processor (NLP) normally removes the residual echo when the near-end signal is below a given threshold. However, when the near-end speech signal is above a given threshold, the non-linear processor (NLP) is typically off. When the NLP removes the residual echo it may also remove background noise from the near-end signal. This on/off effect of the background noise can be quite disturbing. Therefore, so-called comfort noise is estimated and added to the signal when the NLP actively removes residual echo. The comfort noise should be as similar to the original background noise as possible, both in spectrum and amplitude characteristics. Different designs of echo cancellers may have different non-linear processing. This may not be known from the outside.

Other possible voice enhancement devices include mobile cross-talk control (MCC) devices, noise reduction (NR) devices 10-C and fixed level control devices (FLC) 10-D. A mobile cross-talk control (MCC) device is typically used to control far-end acoustic echo. The MCC device may be quite similar to the echo canceller, but often there is no linear filter, only a non-linear processor and possibly an associated comfort noise generator. Noise reduction (NR) devices may be used in both signal directions, whereas level control (LC) devices are generally applied to improve speech quality for the downlink path.

Although non-linear processing in voice enhancement devices such as the echo canceller will improve speech quality and intelligibility, this will also make any objective measurement of speech intelligibility difficult or impossible since it changes the input-output relation for the-considered signal path. If comfort noise is added by an associated comfort noise generator, this will make objective measurements even more difficult.

Figure 5:
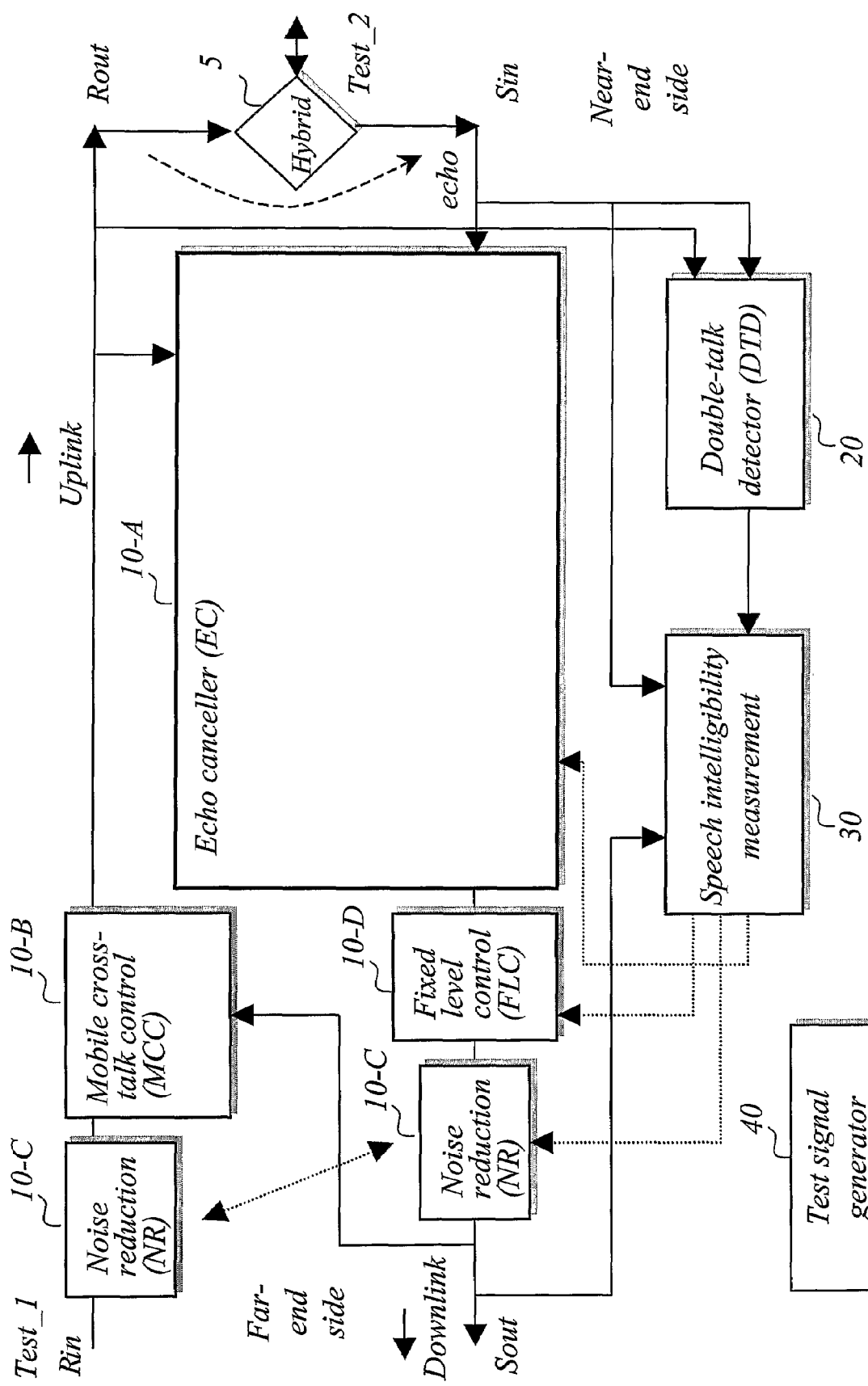
FIG. 5 is a schematic diagram of an arrangement for measuring speech intelligibility on the network side of a digital mobile network according to an exemplary embodiment of the invention.

FIG. 5 is a schematic diagram of an arrangement for measuring speech intelligibility on the network side of a digital mobile network according to an exemplary embodiment of the invention. The arrangement, which is provided on the network side in a network component such as a gateway, basically comprises a double-talk detector 20, a module 30 for speech intelligibility measurements and a test signal generator 40 for simulating two-way speech communication in the gateway. The double-talk detector (DTD) 20 detects higher signal energies from the near-end and the far-end in the simulated speech communication. The output signal of the double-talk detector 20 is forwarded to the intelligibility measurement module 30, which performs speech intelligibility measurements only at periods of double-talk and then estimates an objective measure of speech intelligibility. In essence, this means that the double-talk detector is used for alternately pausing and activating the intelligibility measurement module 30, thus avoiding the negative influence of non-linear processing (and possible added comfort noise) in the speech intelligibility measurements. The estimated measure of speech intelligibility is then preferably analyzed and used as a basis for optimizing the performance of the various voice enhancement devices. This optimization of the voice enhancement devices is typically performed during maintenance/update of the network, for example on a trial-and-error basis, by adjusting the configuration/changing algorithms and evaluating the adjustments with respect to speech intelligibility.

Another aspect of the invention concerns the use of a specialized test signal. Instead of using a complete matrix of differently modulated test signals in different frequency octave bands and determining the modulation transfer function separately for each modulation frequency in each octave band as proposed in the IEC 60268-16 standard, a new test signal is suggested, which makes the measurement procedure much more effective.

Figure 6A:
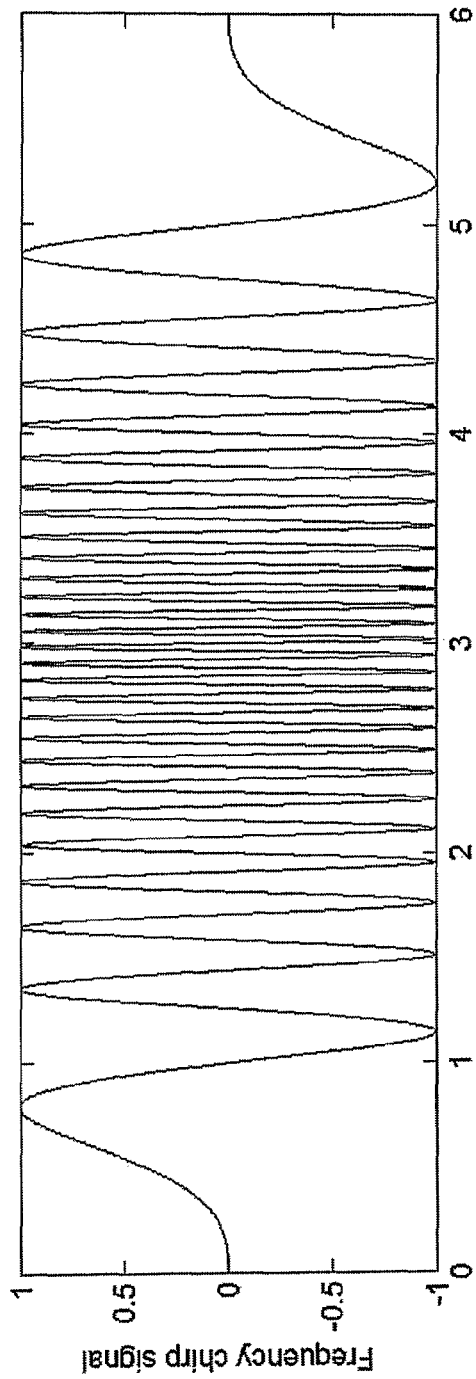
FIG. 6A illustrates an example of a frequency-sweep signal according to the invention.
Figure 6B:
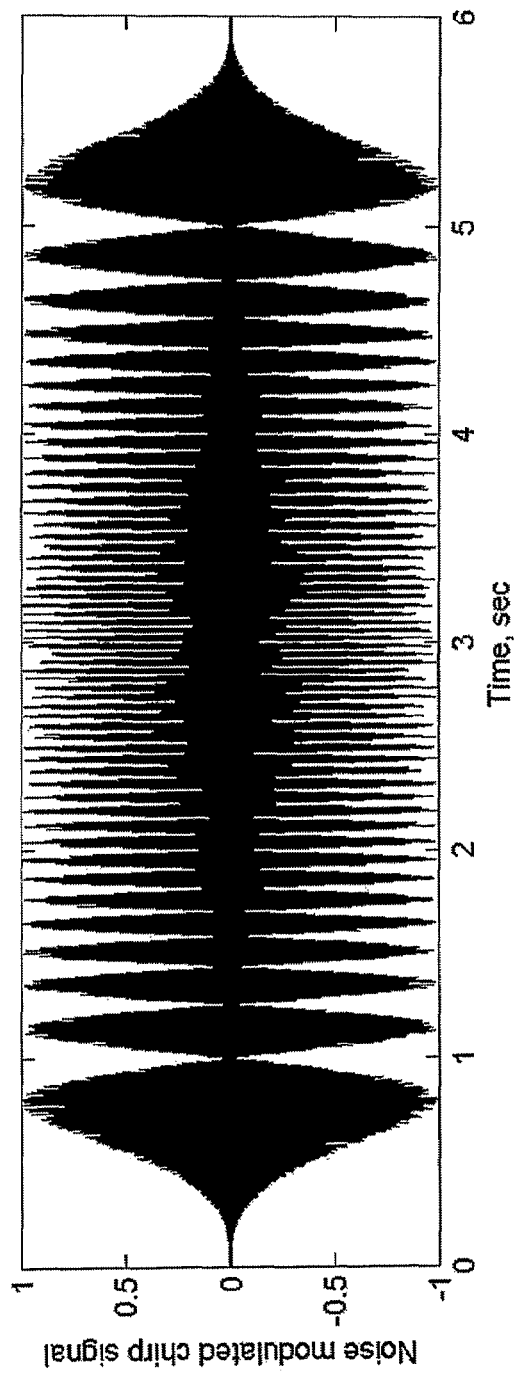
FIG. 6B illustrates an example of a frequency-sweep-modulated noise carrier with a speech-shaped spectrum.

The new test signal preferably comprises a noise carrier, which has a speech-shaped spectrum and which is modulated by a frequency-sweep signal. By emulating normal speech over the entire relevant frequency range in a test signal and modulating the speech-shaped test signal by a frequency sweep, the measurement procedure is much more time-effective and manageable. FIG. 6A illustrates an example of a frequency-sweep signal, and FIG. 6B illustrates an example of a frequency-sweep-modulated noise carrier with a speech-shaped spectrum. The frequency-sweep signal may for example be low-frequency chirp signal, as illustrated in FIG. 6A.

The noise carrier may have a speech spectrum that corresponds to male speech, female. speech and/or child speech. For example, the noise carrier may have a spectrum corresponding to the average speech for a number of different male and female persons of different ages. Alternatively, the noise carrier is composed of a number of different concatenated parts, where one part has a spectrum that corresponds to male speech, another part has a spectrum that corresponds to female speech and yet another part has a spectrum that corresponds to child speech. In other variations, the noise carrier may have a speech spectrum corresponding to a specific language or a combination of different languages. For example, there may be different versions of the test signals depending on the language, one test signal for English speech, another one for Swedish speech and yet another test signal Chinese speech.

Once the noise carrier has been modulated by the frequency sweep, the resulting test signal could be repeated a selectable number of times.

The specialized test signal is preferably inserted into the signal path for which it is desired to estimate a measure of speech intelligibility. In the exemplary configurations shown in FIG. 2 and FIG. 5, for example, the new frequency-sweep modulated test signal is preferably inserted into the near-end signal path of the network component, since it is desired to estimate the speech intelligibility for the near-end signal path. The other test signal inserted into the far-end signal path can more or less be any (conventional) test signal adapted for speech intelligibility measurements, for example a composite source signal (CSS) of simulated voiced and unvoiced signals according to the G.168 standard.

Finally, for a better hands-on feeling of the invention, a set of signals from an exemplary simulation and speech intelligibility measurement procedure will now be described with reference to FIGS. 7A-D. The measurement procedure is here performed in a set-up corresponding to the configuration of FIG. 5.

Figure 7A:
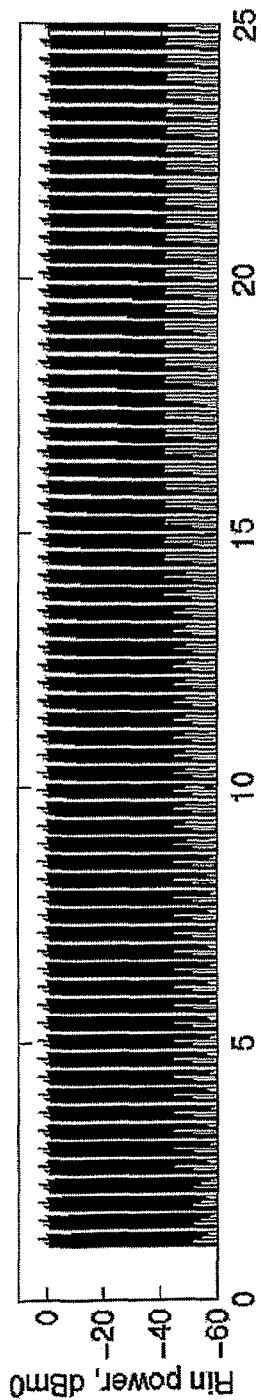
FIGS. 7A-D illustrate a relevant set of signals from an exemplary simulation and speech intelligibility measurement procedure.

FIG. 7A illustrates the input signal power ($R_{IN}$) from the far-end. In this example, this signal is a CSS (Composite Source Signal) that consists of voiced and unvoiced signals according to the G.168 standard.

Figure 7B:
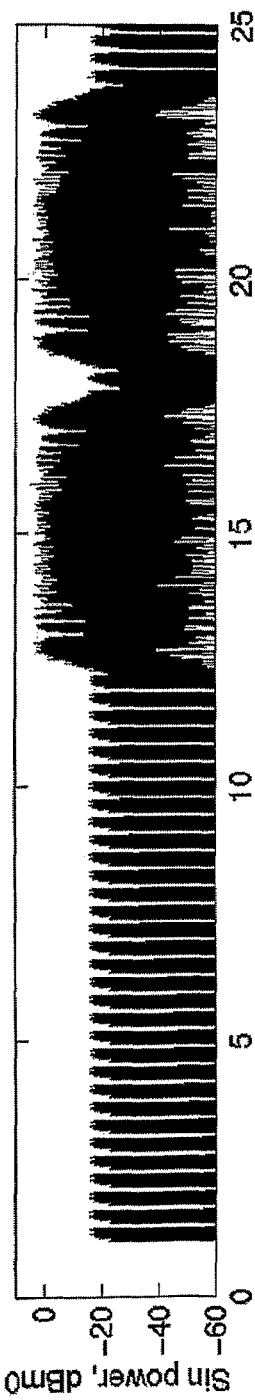

FIG. 7B illustrates the input signal power ($S_{IN}$) from the near-end. This signal includes the echo signal from the far-end plus the near-end test signal. Note that the echo level is 20 dB ERL (echo return loss), and that there is no noise at the near-end in the simulation.

Figure 7C:
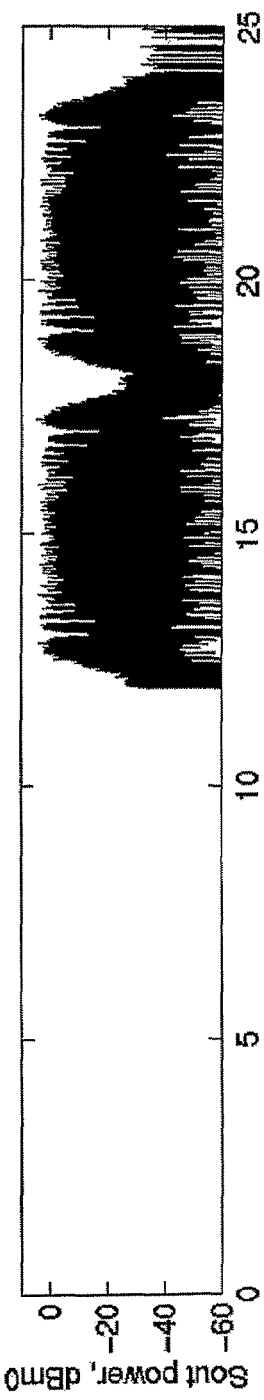

FIG. 7C illustrates the output signal power ($S_{OUT}$) to the far-end. In this example, the echo cancellation converges directly so that the echo is clipped away by the NLP of the echo canceller in the near-end path.

Figure 7D:
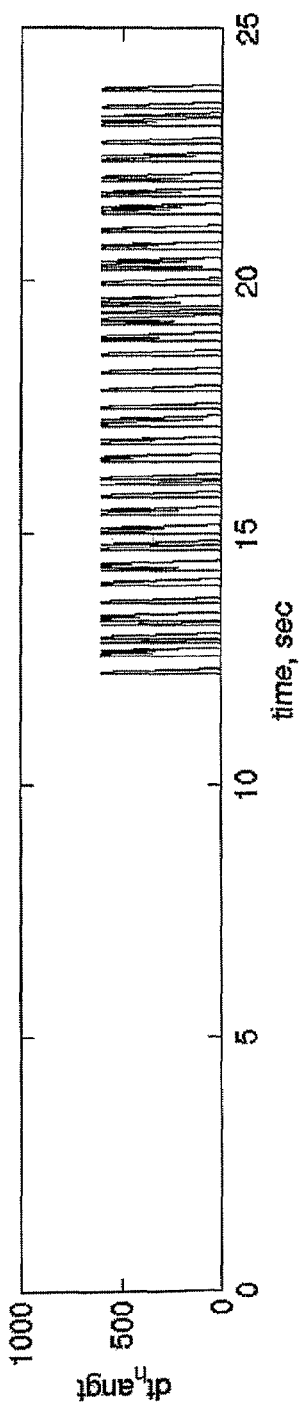

FIG. 7D is representative of a so-called double-talk hang-over, where $dt_{hangt}=0$ means that there is no double talk, and $dt_{hangt}>0$ means that double talk is detected.

A measure of speech intelligibility, such as STI, can for example be extracted from the difference between the $S_{IN}$ and $S_{OUT}$ signals when the test signal is on the valley period and at double-talk time.

The embodiments described above are merely given as examples, and it should be understood that the present invention is not limited thereto. Further modifications, changes and improvements which retain the basic underlying principles disclosed and claimed herein are within the scope of the invention.

The invention claimed is:

1. A method of objectively measuring speech intelligibility in a mobile communication network component handling two-way communication between a near end and a far end, said method comprising the steps of:
   simulating two-way speech communication based on test signals adapted for speech intelligibility measurements;
   detecting double-talk during said simulated speech communication; and
   performing, in response to said test signals, measurements of the difference in power between a total input signal from the near-end and an output signal to the far-end at signal valley time over at least part of a near-end signal path in said network component only at periods of double-talk, alternately pausing and activating the measurements, to estimate an objective measure of quality of speech with respect to intelligibility.

2. The method of claim 1, wherein said near-end signal path comprises at least one voice enhancement device with speech-activity controlled non-linear signal processing.

3. The method of claim 2, wherein said at least one voice enhancement device includes an echo canceller with non-linear signal processing and an associated comfort noise generator.

4. The method of claim 1, wherein one of said test signals is a specialized test signal comprising a noise carrier, which has a speech-shaped spectrum and which is modulated by a frequency-sweep signal, and the method includes inserting the specialized test signal into the near-end signal path of the network component.

5. The method of claim 4, wherein said frequency-sweep signal is a low-frequency chirp signal.

6. The method of claim 4, wherein said noise carrier has a speech-shaped spectrum over the normal telecommunication speech frequency range.

7. The method of claim 1, further comprising utilizing the objective measure of speech intelligibility to estimate a speech transmission index representative of transmission quality of speech with respect to intelligibility.

8. The method of claim 1, further comprising adjusting the configuration of at least one voice enhancement device in said communication network in response to the objective measure of speech intelligibility.

9. An apparatus for objectively measuring speech intelligibility in a mobile communication network component handling two-way communication between a near end and a far end, said apparatus comprising:
   means for simulating two-way speech communication based on test signals adapted for speech intelligibility measurements;
   means for detecting double-talk during said simulated speech communication; and
   means for performing, in response to said test signals, measurements of the difference in power between a total input signal from the near-end and an output signal to the far-end at signal valley time over at least part of a near-end signal path in said network component only at periods of double-talk, alternately pausing and activating the measurements, to estimate an objective measure of quality of speech with respect to intelligibility.

10. The apparatus of claim 9, wherein said near-end signal path comprises at least one voice enhancement device with speech-activity controlled non-linear signal processing.

11. The apparatus of claim 10, wherein said at least one voice enhancement device includes an echo canceller.

12. The apparatus of claim 9, wherein one of said test signals is a specialized test signal comprising a noise carrier; which has a speech-shaped spectrum and which is modulated by a frequency-sweep signal, and said means for simulating speech communication includes means for inserting said specialized test signal into the near-end signal path of the network component.

13. The apparatus of claim 12, wherein said frequency-sweep signal is a low-frequency chirp signal.

14. The apparatus of claim 12, wherein said noise carrier has a speech-shaped spectrum over the normal telecommunication speech frequency range.

15. The apparatus of claim 9 further comprising means for utilizing the objective measure of speech intelligibility to estimate a speech transmission index representative of transmission quality of speech with respect to intelligibility.

16. The apparatus of claim 9, wherein said network component is a communication gateway.

17. The apparatus of claim 9, further comprising means for adjusting the configuration of at least one voice enhancement device in said network component in response to the objective measure of speech intelligibility.

* * * * *